UNITED STATES PATENT OFFICE.

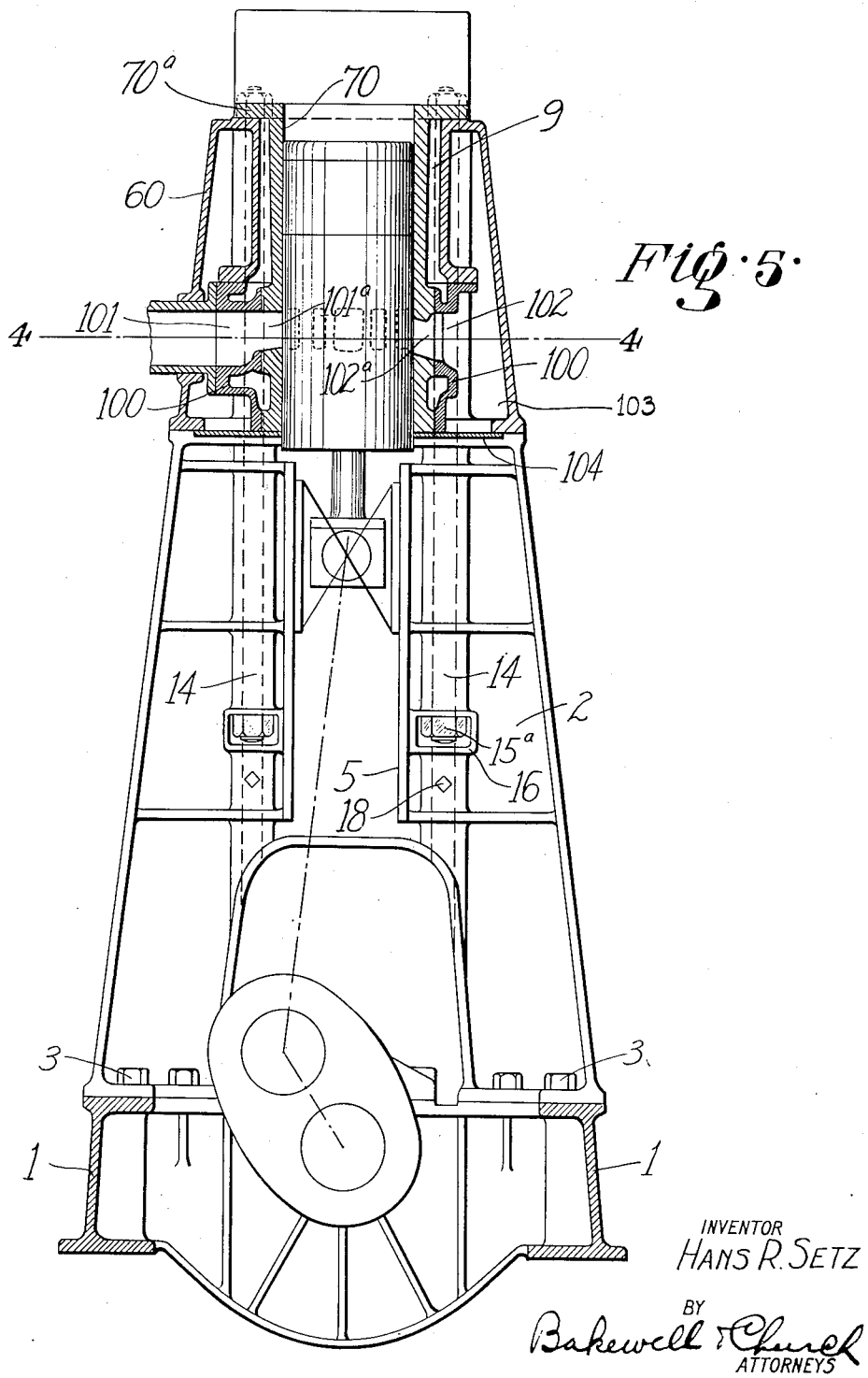

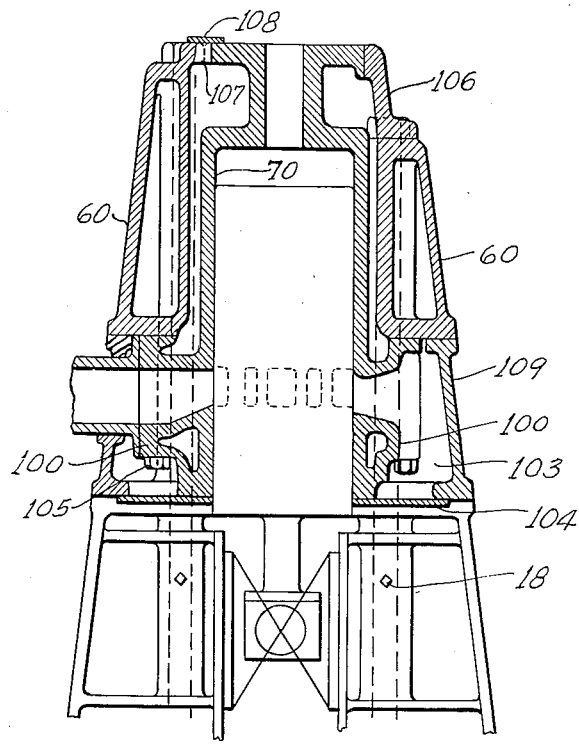
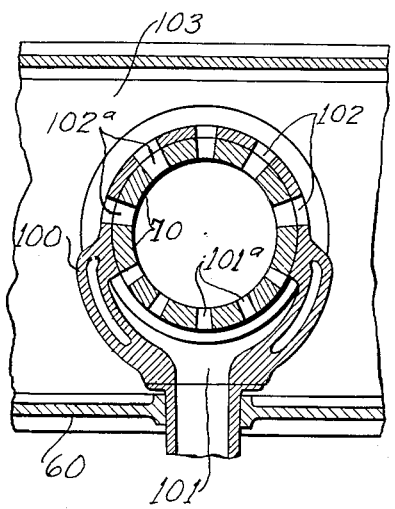

HANS R. SETZ, OF MANITOWOC, WISCONSIN.

INTERNAL-COMBUSTION ENGINE.

1,404,550.

Specification of Letters Patent.　Patented Jan. 24, 1922.

Application filed July 26, 1920. Serial No. 399,041.

*To all whom it may concern:*

Be it known that I, HANS R. SETZ, a citizen of the United States, residing at Manitowoc, Wisconsin, have invented a certain new and useful Improvement in Internal-Combustion Engines, of which the following is a full, clear, and exact description, such as will enable others skilled in the art to which it appertains to make and use the same.

This invention relates to internal combustion engines. In internal combustion engines of the cross head type it has heretofore been the usual practice either to form the cylinders from liners that are rigidly mounted in accurately bored openings in a deep beam-like structure that forms the top portion of the frame of the engine, or arrange the cylinder liners in separate castings that are bolted to the top side of a shallow member that forms the top portion of the frame of the engine. A structure of the kind first referred to is difficult to manufacture and necessitates the use of a complicated casting for the top member of the frame when scavenging and exhaust ports are formed in the cylinder liners and the other form of construction is objectionable, in that it has not the requisite rigidity, and moreover, tends to subject the outer cylinder walls to heavy endwise stresses. When tie rods are used to eliminate flange connections and to relieve the cast members of the engine frame from excessive tensional stresses it has heretofore been the general practice to use long tie rods of relatively great cross-sectional area that extend from the top member of the frame to the underside of the bed plate, thus making it difficult to erect or disassemble the engine in close quarters, such, for example, as on ships.

One object of my invention is to provide a frame for internal combustion engines in which the top member of the frame consists of a relatively deep beam in which the cylinders are mounted in such a manner that each cylinder can be moved independently of said beam and properly lined up with its co-operating crank, irrespective of the accuracy of the machine work. Such a construction materially simplifies the machining operation and permits the use of lighter castings of less intricate design, and it permits the members or portions of the frame that are used for the transmission of loads to be properly designed for the function for which they are intended.

Another object of my invention is to make possible the combination of a deep cylinder beam with two cycle cylinders permitting the convenient placing of the necessary ports without affecting the simplicity of the cylinder beam irrespective of whether these cylinder liners are centered in bored openings of the beam or whether special centering devices are used.

Another object of my invention is to provide a frame for internal combustion engines which is of such design that relatively short tie rods capable of being easily installed or removed are used to hold the top member of the frame in operative position. Other objects and desirable features of my invention will be hereinafter pointed out.

Figure 1 of the drawings is a vertical transverse sectional view of a three-cylinder, four-cycle internal combustion engine provided with a frame constructed in accordance with my invention.

Figure 5 is a vertical transverse sectional view of a two-cycle engine provided with a frame constructed in accordance with my invention.

Figure 6 is a horizontal sectional view, taken on the line 4—4 of Figure 5.

Figure 7 is a vertical transverse sectional view of two-cycle engine showing the same general frame construction but a somewhat modified cylinder mounting.

Figure 1:
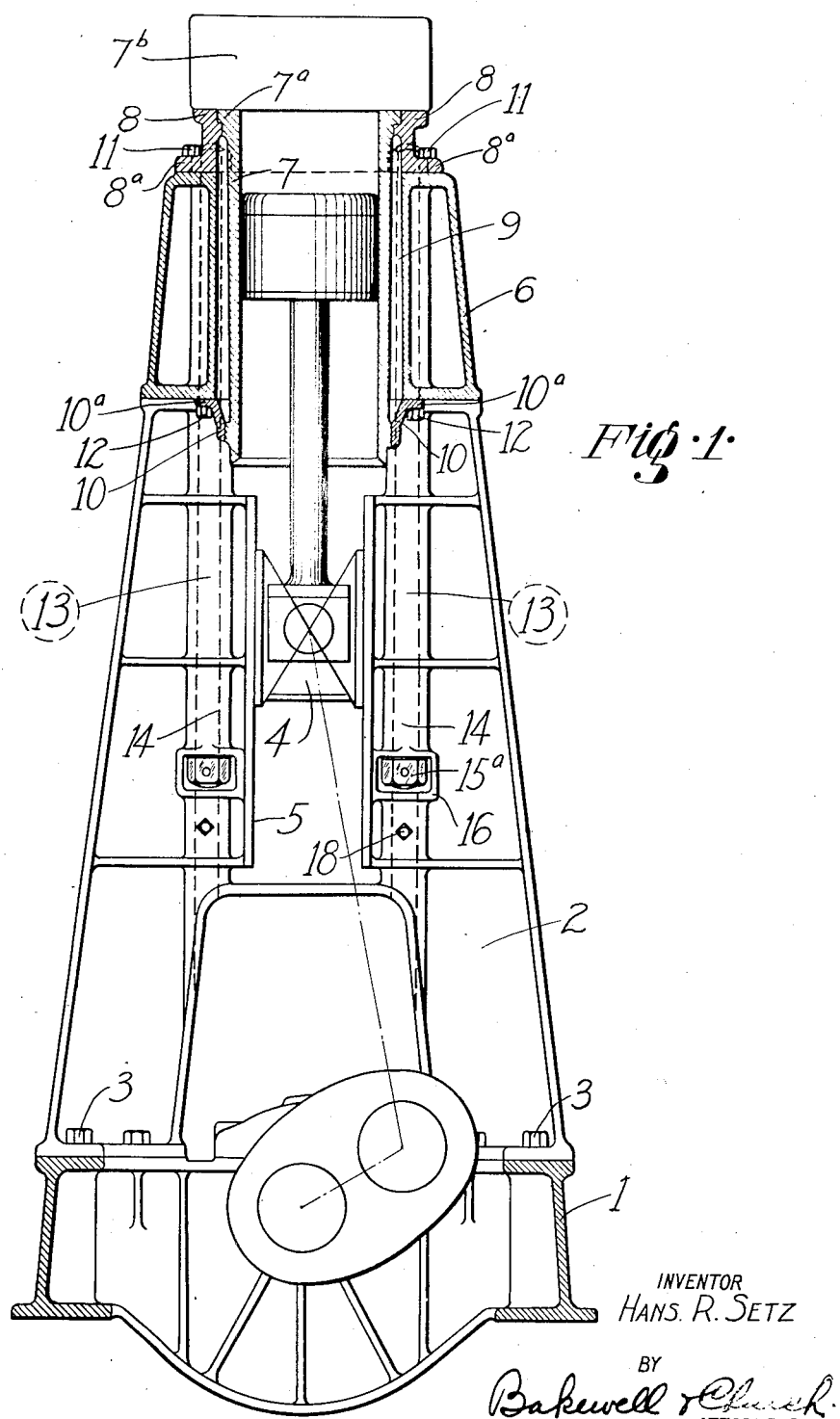
Figure 2:
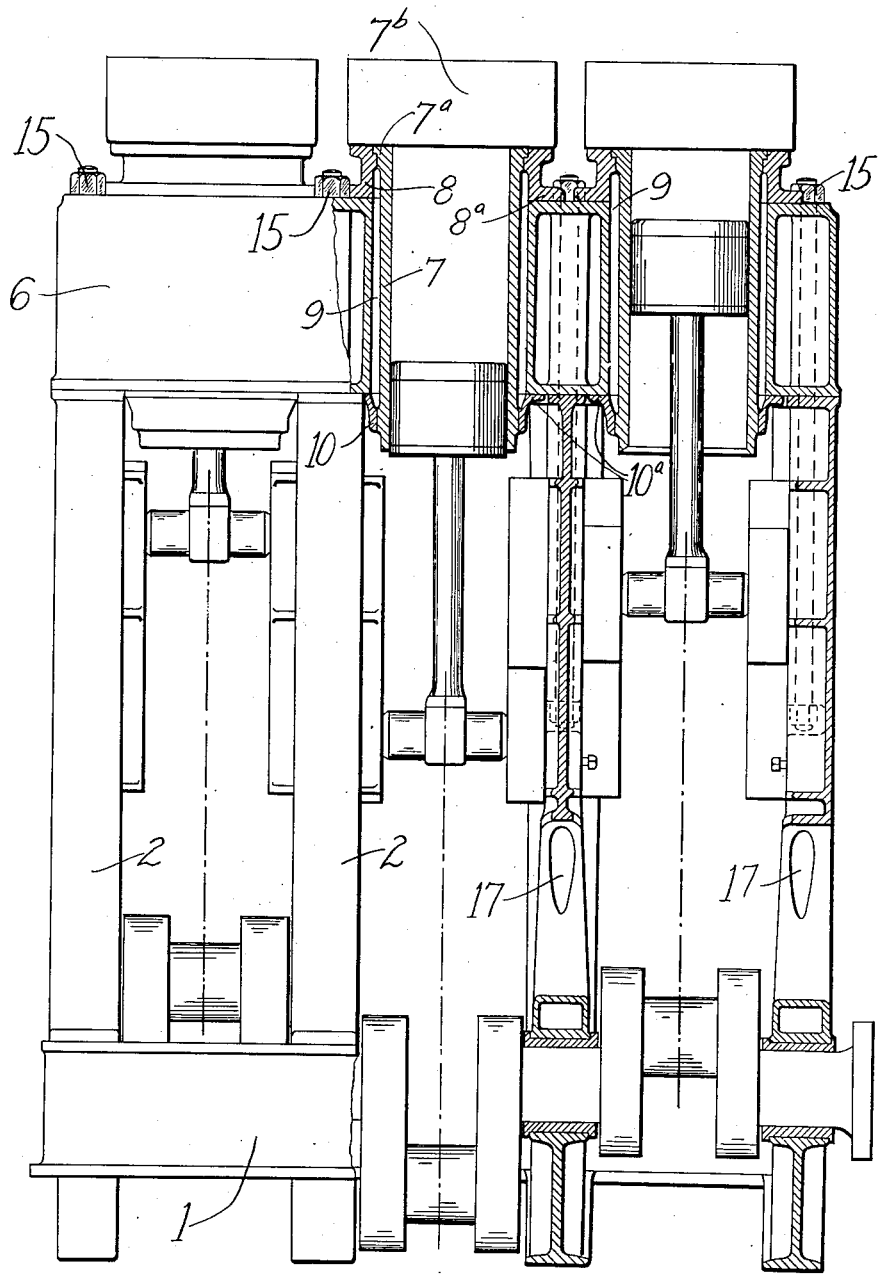
Figure 2 is a side elevational view of said engine, partly in longitudinal section.

Referring to Figures 1 and 2 of the drawings, which illustrate one form of my invention, 1 designates the bed plate of the frame of the engine, 2 the A frames which are mounted on the bed plate in the planes of the main shaft bearings and connected to said bed plate by bolts or other suitable fastening devices 3, as shown in Figure 1, 4 designates the cross heads which slide in vertical cross head guides 5 and on the A frames 2, and 6 designates a beam-like casting extending longitudinally of the engine at the upper ends of the A frames 2 for tying said A frames together and for supporting the cylinders 7.

The cylinders 7 are preferably mounted in the top member 6 of the frame in such a manner that they can be moved relatively to said top member 6 sufficiently to insure proper alignment of the cylinders and their co-operating cranks. In the form of my invention shown in Figures 1 and 2 each cylinder or cylinder liner 7 has its upper end portion fitted in a collar or short tubular member 8 that rests upon a horizontally machined surface on the top member 6 of the engine frame, said cylinder liner being preferably provided adjacent its upper end with a laterally projecting flange that fits in an annular seat or recess in the collar 8. The openings in the top member 6 of the frame which receive the cylinder liners are made large enough in transverse cross section to provide sufficient clearance 9 between each cylinder liner and the opening in the member 6 in which said liner is arranged to permit the liner to be shifted sidewise in any desired direction. The lower end portions of the cylinder liners 7 are held in proper spaced relation with the side walls of the openings in the top frame member 6 which receive said cylinder liners by means of collars 10 surrounding the lower end portions of the cylinder liners 7 and connected to the underside of the top frame member 6. The frame member 6 is provided on its upper side and on its lower side, respectively, with horizontally-disposed, machined surfaces that extend in parallel relation to each other, and the collars 8 and 10 which embrace the opposite end portions of the cylinder liners bear against the machined surfaces on the upper side and on the underside, respectively, of the frame member 6 and are rigidly connected to said member 6 in any suitable way, as, for example, by means of short bolts 11 that pass through flanges 8ᵃ at the lower ends of the collars 8 and short bolts 12 that pass through flanges 10ᵃ at the upper ends of the collars 10, as shown in Figure 1. The centering collars 10 at the lower ends of the cylinder liners also serve as closures for the lower ends of the openings 9 in the top beam 6 of the frame in which the cylinder liners are arranged, thereby permitting the spaces between said liners and the side walls of said openings to be used to form water jackets for the cylinders. In view of the fact that the cylinders 7 are rigidly held at their upper ends between the top member 6 of the frame and the heads 7ᵇ of the cylinders which lap over the collars 8, and sliding joints are provided between the lower end portions of the cylinders and the centering collars 10, the cylinders are free to expand and contract longitudinally under the influence of the working temperature.

By mounting the cylinders in the manner above described, I obtain a rigid mounting for each cylinder without having to resort to any boring operation whatsoever in the top member of the engine frame; I am able to shift each cylinder laterally relatively to the cylinder beam and thus to line it up accurately with its cooperating crank, and I am able to use a top member for the frame consisting of a box-shaped, deep sectional beam which has sufficient strength and rigidity to successfully withstand the strains to which it is subjected when the engine is in service.

The top member or beam 6 of the frame is connected to the A frames 2 by tie rods 13 that extend downwardly through the member 6 and through bosses 14 on the A frames, said tie rods being provided at their upper ends with nuts 15 that bear upon the top side of the beam 6 and the lower ends of said tie rods terminating at a point in proximity to the lower ends of the cross head guides 5. Pockets 16 are provided in the A frames 2 to receive the nuts 15ᵃ at the lower ends of the tie rods, and the holes in the A frames through which the tie rods 13 extend are open at their lower ends, as indicated by the reference character 17 in Figure 2, so as to permit the tie rods to be lowered through said holes after the tie rod nuts have been removed. The pockets 16 are so located that the total length of the tie rods will never exceed the height of the A frames 2. If, therefore, at any time it should become necessary to remove one of the A frames, this can be easily accomplished by lowering the tie rods of said A frame sufficiently to clear the top beam 6 and temporarily securing said tie rods by means of set screws 18 arranged below the pockets 16, as shown in Figure 1, and then sliding the A frame, together with the tie rods mounted therein laterally from under the top member 6 of the frame. Accordingly, an engine frame of the construction above described requires no head room or open space above the frame to make it possible to remove the tie rods that secure the top member or beam of the frame to the A frames. Furthermore, the difficulty of providing suitable flange connections between the upper ends of the A frames and the underside of the top beam that carries the cylinders is obviated by the construction above described. The tie rods themselves are considerably reduced in length from what would be necessary if the tie rods extended clear through to the underside of the bed plate, and accordingly, the elastic deformations can be more easily kept within permissible limits without having to resort to too heavy a tie rod cross section. With such a construction only the material in the feet or the lower portions of the A frames is subjected to tension and slight bending stresses, but inasmuch as the width of said portions is such as to easily provide enough material, this is not objectionable. The requirement of a flange connection between the lower ends of the A frames and the bed plate can easily be taken care of in such a construction, since, for other reasons, the bed plate has to be made quite heavy and the place where the connections are made is readily accessible at all times.

Figure 3:
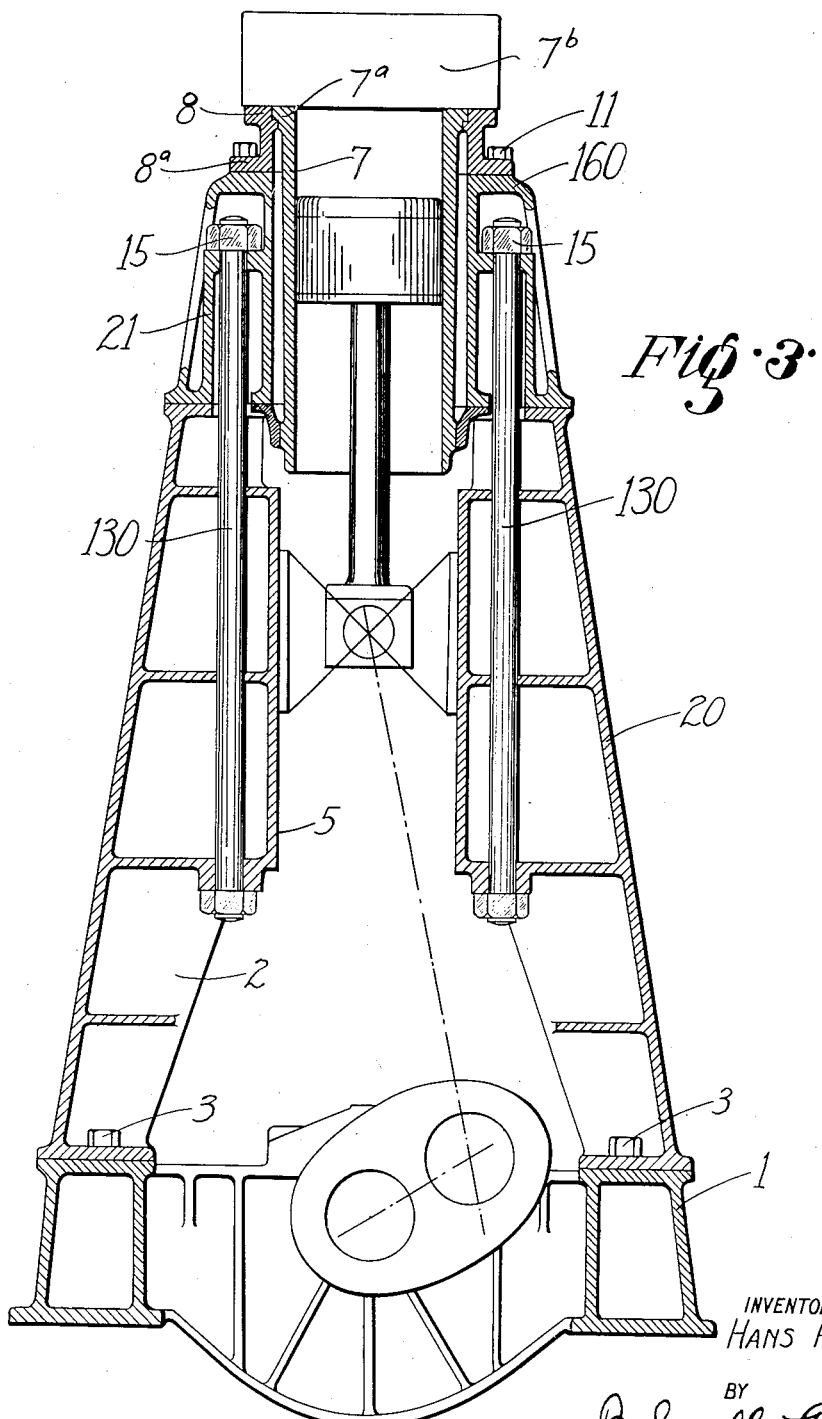
Figure 3 is a transverse sectional view, illustrating a modification of my invention, the engine shown in Figure 3 being of a four-cycle type and provided with two cylinders.
Figure 4:
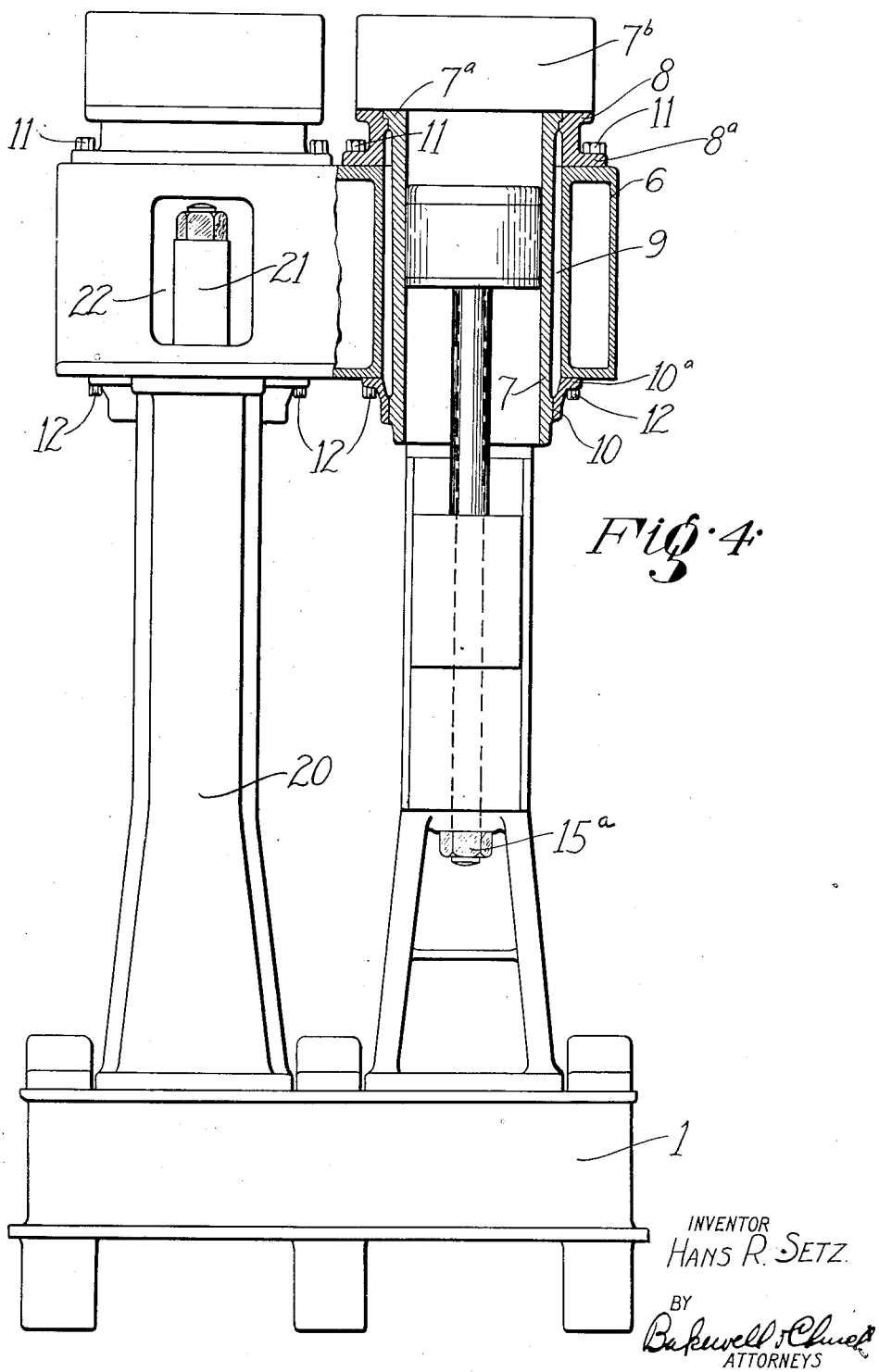
Figure 4 is a side elevational view, partly in longitudinal section, of the engine shown in Figure 3.

In Figures 3 and 4 I have illustrated my invention embodied in a frame for a typical form of large engine wherein the frame columns are arranged in the same vertical planes in which the connecting rods swing. In general design the frame of the engine shown in Figures 3 and 4 is substantially the same as the frame of the engine shown in Figures 1 and 2, except that the tie rods 130 terminate at their lower ends on the underside of the portions of the frame columns 20 that carry the cross head guides 5, and the upper ends of said tie rods terminate at bosses 21 in the cylinder beam or top member 160 of the frame, as shown in Figure 3, the nuts 15 mounted on the upper ends of said tie rods bearing upon the upper end faces of the bosses 21. By arranging the tie rods in this manner I avoid projections on the top side of the cylinder beam 160 at the points where the supporting collars 8 for the cylinder liners are arranged. The cylinder beam 160 is provided at its sides with openings 22, as shown in Figure 4, so as to provide access to the upper tie rod nuts 15.

Instead of mounting the cylinders or cylinder liners in collars supported on the cylinder beam or top member 6 of the frame, as shown in Figures 1 and 2, the cylinder liners 70 can be mounted directly upon the top beam or member 60 of the frame, as shown in Figure 5, which illustrates a two cycle engine provided with a frame constructed in accordance with my invention. In the engine shown in Figure 5 each cylinder liner 70 is provided at its upper end with a flange 70$^a$ that bears upon the horizontally-disposed, machined surface on the top side of the beam 60 of the frame. The lower end portion of each cylinder liner is embraced by a belt member 100, which, in addition to performing the function of a centering collar, is so designed that it performs the additional function of conducting the exhaust gases out of the cylinder and supplying scavenging air to the cylinder. As shown in Figures 5 and 6, the member 100 is provided with an exhaust passageway 101 and scavenging air inlets 102 so arranged with relation to the exhaust ports 101$^a$ and the scavenging air inlet ports 102$^a$, respectively, of the cylinder that the burnt gases which escape from the cylinder will travel through the passageway 101 and the scavenging air which is supplied to the cylinder will be admitted through the inlets 102 in the member 100. If desired, the member 100 can be provided with a single passageway for the exhaust gases, instead of with a passageway for the exhaust gases and inlets for the scavenging air. When the member 100 is formed in the manner illustrated in Figures 5 and 6, either the hollow space 103 in the cylinder beam or top member 60 of the frame can be used as a reservoir or receiver for the scavenging air, the lower end of said space being closed by a plate 104, as shown in Figure 5, or said air receiver may be built up separately by the use of suitable plates on the underside of cylinder beam 60. In either case the flange connection for piece 100 to the cylinder beam 60 is so located that piece 100 will be substantially enclosed by the air receiver space 103. In an engine of the construction shown in Figures 5 and 6 the centering members 100 do not have to transmit any longitudinal stresses due to the working cycle of the cylinders. On the contrary, the longitudinal stresses are transmitted from the cylinder head directly into the cylinder beam or top member 60, which, due to its deep, box-shaped section, will readily answer all requirements as to strength and rigidity. Accordingly, it is possible with such a construction, to give the exhaust and scavenging belts a form more suitable for their particular function, and moreover, such a construction permits the use of very light castings of such design that a uniform distribution of material is insured, a thing that is not possible with the design of framing heretofore in use, owing to the fact that the portions of the engine in which the exhaust and scavenging air belts are formed are also utilized to transmit longitudinal stresses.

It is obvious that without detracting from the spirit of this invention, the constructional forms illustrated so far may be modified in such manner as to hold the cylinder rigidly at the lower end and slidably at the upper end, which need in no way affect the provision of lateral adjustment of each cylinder relatively to the frame member in which it is mounted. In Figure 7 the belt member 100, containing exhaust and scavenging ports, is shown as an integral part of cylinder 70, the latter being rigidly fastened to the underside of frame member 60 by means of bolts 105 suitably located in belt member 100. At its upper end the connection between cylinder 70 and frame member 60 may again consist of a flange 106, slidably centered over a turned portion of the cylinder or cylinder head and clamped against the top face of beam member 60 as shown at the right hand side of Fig. 7, or an annular space 107 may be left between the top end of cylinder 70 or its cylinder head, and the top end of frame member 60, said annular space 107 being bridged over by an annular plate 108 as shown at the left hand side of Fig. 7. The feature of this cylinder mounting consists again of means of fastening one end of cylinder against a face on the underside of beam 60 which runs parallel to the top face, and to locate in this lower cylinder fastening means scavenging and exhaust ports. The air receiver space 103 on the underside of frame member 60 is here shown as a separately built up member 109 which may consist of a cast structure or suitable plating. So far as the features of my invention which I have just enumerated are concerned, it is immaterial whether or not the cylinder liners are capable of being moved sidewise with relation to the cylinder beam as herein shown; quite the same effect can be accomplished for instance in combination with cylinder liners that are definitely centered in said beam, as, for example, by means of portions at the upper end of the cylinder liners that fit in seats formed in the cylinder beam.

While I have herein illustrated my invention embodied in a frame for an engine of the crosshead type, such a construction is well adapted to engines of the trunk piston type. Furthermore, while I have herein illustrated several forms of frames embodying my invention, each form has the same general characteristic, namely, a top member or beam that connects the A frames or the vertical columns of the engine frame together and cylinders or cylinder liners mounted in said beam and held at their upper and lower ends by devices that bear upon parallel top and bottom faces on said beam. In addition to the desirable features above pointed out, such a construction provides a superior method of transmitting the inevitable side thrusts due to the angularity of the connecting rods, directly into the frame, instead of exerting a bending moment upon the cylinders as is inevitably the case with the frames now generally used on internal combustion engines.

The illustrations given herewith all refer to cylinders of the single acting type, but it is to be understood that the same method of mounting may apply to cylinders of the double acting type.

Having thus described my invention, what I claim and desire to secure by Letters Patent, is;

1. A frame for internal combustion engines, comprising a top member, a cylinder mounted within said top member, and means for rigidly securing said cylinder at one end and slidably at the other end, said means permitting of lateral adjustment of the cylinder relatively to said top member.

2. A supporting means for a cylinder or a cylinder liner, comprising a member having an opening in which the cylinder is arranged, said opening being of such size that the cylinder can be adjusted laterally with relation to said member during the operation of lining up the cylinder with its co-operating crank, and a holding means for said cylinder which permits said cylinder to expand or contract longitudinally.

3. A supporting means for a cylinder or a cylinder liner, comprising a member having a cylinder opening and spaced parallel faces arranged at right angles to said opening, a cylinder arranged in said opening and spaced away from the walls thereof sufficiently to permit the cylinder to be adjusted laterally with relation to said member during the operation of lining up the cylinder with its co-operating crank, and devices at the opposite end portions of said cylinder bearing upon the parallel faces on said member and rigidly connected to said member for the purpose of holding the cylinder in operative relationship with said member.

4. An internal combustion engine provided with A-shaped frames, a top member of substantially hollow beam form that ties said A frames together, cylinders or cylinder liners arranged in openings in said top member, each of said openings being of such size that the cylinder therein can be adjusted laterally with relation to said member during the operation of lining up the cylinder with its cooperating crank, and elements on said top member that are capable of being adjusted relatively to said top member during the operation of lining up the cylinders and their co-operating cranks and which are adapted to be rigidly connected to said top member so as to hold the cylinders in operative position.

5. A cylinder mounting, comprising a frame member, a cylinder mounted within said frame member, means for fastening said cylinder against the underside of the frame member, and ports through said fastening means leading into the cylinder.

6. A cylinder mounting, comprising a frame member, a cylinder mounted within said frame member, means for rigidly fastening said cylinder to said frame member at one end and slidably at the other end, said means permitting of lateral adjustment of the cylinder relatively to the frame member, and circumferentially disposed ports through one of said fastening means and the correlated cylinder wall.

7. A cylinder mounting, comprising a longitudinally disposed frame member, an air receiver extending longitudinally of said member, a cylinder mounted within said frame member, and means for fastening said cylinder to said frame member, said fastening means being located substantially within the air receiver space and being provided with ports leading into the interior of the cylinder.

8. A cylinder mounting, comprising a longitudinally disposed frame member, means serving as an air receiver on the underside of said frame member, a cylinder mounted within said frame member, upper and lower means for fastening said cylinder to said frame member, said lower fastening means being located substantially within the air receiver space and provided with ports entering into the cylinder and from the cylinder to a passage leading through the air receiver space to the outside atmosphere.

9. In an internal combustion engine, the combination of a hollow member that serves as a scavenging air receiver, a cylinder formed by a part separate and distinct from said hollow member and arranged inside of same in such a way that the scavenging air receiver surrounds the cylinder, and a holding device extending circumferentially of the portion of the cylinder in which the exhaust ports and scavenging ports are formed, said holding device having openings through which the scavenging air travels in passing from the receiver into the cylinder and also having a passage-way leading to the outside of said hollow member through which the exhaust gases escape from the cylinder.

10. A frame for internal combustion engines, comprising columns or vertically-disposed uprights, a top member mounted on said uprights, and tie rods for connecting said top member to said uprights and so proportioned that the length of same is less than the length of the uprights.

11. A frame for internal combustion engines, comprising vertical columns or supporting structures, a longitudinally-disposed top member that ties said columns together, and vertically-disposed tie rods connecting said top member to said columns and so constructed that they can be moved downwardly sufficiently to withdraw said tie rods from said top member when it is desired to remove one of said columns from operative position under said top member.

12. A frame for internal combustion engines, comprising a bed plate, columns or vertically-disposed supporting structures mounted on said bed plate and connected to same, a longitudinally-disposed top member that ties said columns together, and vertically-disposed tie rods in said columns that retain said top member in position and whose lower ends terminate high enough above the bed plate to permit said rods to be moved downwardly when it is desired to disconnect one of said columns from said top member.

13. A frame for internal combustion engines, comprising a bed plate, A shaped frames, columns or other suitable vertically disposed supporting structures mounted on said bed plate, a top member arranged longitudinally of the engine and mounted on said supporting structures, means for connecting the lower end portions of said supporting structures to said bed plate, and vertically-movable tie rods in said supporting structures that retain said top member in position and which are capable of being moved downwardly sufficiently to clear said top member without causing the lower ends of said rods to engage said bed plate, thereby permitting any one of said A shaped frames, columns or supporting structures to be moved laterally out of operative position under the top member of the frame.

HANS R. SETZ.